(12) United States Patent
Laine et al.

(10) Patent No.: US 11,774,602 B1
(45) Date of Patent: Oct. 3, 2023

(54) MULTI-SOURCE DISTRIBUTED NAVIGATION SYSTEM ARCHITECTURE

(71) Applicant: The Charles Stark Draper Laboratory, Inc., Cambridge, MA (US)

(72) Inventors: Juha-Pekka J. Laine, Boston, MA (US); Benjamin F. Lane, Sherborn, MA (US); William W. Whitacre, Boston, MA (US); Robin Mark Adrian Dawson, Waltham, MA (US); Joseph M. Kinast, Arlington, MA (US); Cort Nolan Johnson, Arlington, MA (US); Gregory P. Blasche, Burlington, MA (US); Michael A. Aucoin, North Andover, MA (US); Jeffrey D. Jungemann, Cordova, MD (US); Peter A. Lewis, Reston, VA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 17/509,912

(22) Filed: Oct. 25, 2021

Related U.S. Application Data

(63) Continuation of application No. 16/177,419, filed on Oct. 31, 2018, now abandoned, which is a
(Continued)

(51) Int. Cl.
*G01S 19/47* (2010.01)
*G01C 21/28* (2006.01)
(Continued)

(52) U.S. Cl.
CPC ............ *G01S 19/47* (2013.01); *G01C 21/165* (2013.01); *G01C 21/28* (2013.01); *G01S 5/0009* (2013.01); *G01S 5/0072* (2013.01); *G01S 19/05* (2013.01)

(58) Field of Classification Search
CPC ...... G01S 19/47; G01S 5/0009; G01S 5/0072; G01S 19/05; G01C 21/165; G01C 21/28
See application file for complete search history.

(56) References Cited

U.S. PATENT DOCUMENTS

| 5,923,286 A | 7/1999 | Divakaruni |
| 7,418,343 B1 * | 8/2008 | McGraw .................. G01S 3/36 244/76 R |

(Continued)

FOREIGN PATENT DOCUMENTS

| EP | 2 244 063 A2 | 10/2010 |
| EP | 2 503 510 A1 | 9/2012 |

(Continued)

OTHER PUBLICATIONS

European Patent Office as the International Searching Authority, Authorized Officer: Michael Liebelt, International Search Report and Written Opinion of the International Searching Authority, PCT/US2018/000073, Jun. 20, 2018, 13 pages.

(Continued)

*Primary Examiner* — Donald H B Braswell
(74) *Attorney, Agent, or Firm* — Brooks Kushman, P.C.

(57) ABSTRACT

A distributed navigation system includes navigation platforms, each having a universal navigation processor, relative navigation systems to provide source information to the navigation platforms, navigation filters provided on one or more of the universal navigation processors, and an anchor navigation node disposed on one or more of the navigation platforms to form one or more anchor navigation platforms. Each anchor navigation node includes an inertial navigation system, a clock, and absolute navigation systems, which are used, in combination with source information, to determine navigation information. The anchor navigation platforms provide the navigation information to other navigation platforms. The system further includes a navigation processor (Continued)

system in communication with the universal navigation processors to provide operating information updates to the universal navigation processors and a graphical user interface to display the navigation information to a user and permit the user to review and control the navigation information.

20 Claims, 9 Drawing Sheets

Related U.S. Application Data continuation-in-part of application No. 15/494,898, filed on Apr. 24, 2017, now Pat. No. 11,150,357.

(51) Int. Cl.
*G01C 21/16* (2006.01)
*G01S 19/05* (2010.01)
*G01S 5/00* (2006.01)

(56) References Cited

U.S. PATENT DOCUMENTS

| | | | |
|---|---|---|---|
| 2010/0073218 A1* | 3/2010 | Stockmann | G01S 13/5248 342/146 |
| 2010/0283832 A1* | 11/2010 | Lin | G06K 9/6293 348/46 |
| 2013/0265193 A1 | 10/2013 | Kennedy et al. | |
| 2014/0019038 A1 | 1/2014 | Shehi et al. | |
| 2016/0349362 A1* | 12/2016 | Rohr | G01S 13/86 |
| 2017/0094631 A1* | 3/2017 | Pon | G01S 5/0249 |
| 2017/0131716 A1* | 5/2017 | Brekke | G01C 21/20 |
| 2018/0136665 A1* | 5/2018 | Mudalige | G05D 1/0248 |

FOREIGN PATENT DOCUMENTS

| | | |
|---|---|---|
| EP | 2 930 534 A1 | 10/2015 |
| EP | 3 073 224 A1 | 9/2016 |

OTHER PUBLICATIONS

European Patent Office as the International Searching Authority, Authorized Officer: Michael Liebelt, International Search Report and Written Opinion of the International Searching Authority, PCT/US2018/000059, Jun. 6, 2018, 18 pages.

Commander Naval Air Systems Command, NATOPS Flight Manual Navy Model F/A-18A/B/C/D 161353 and Up Aircraft, Commander Naval Air Systems Command, 89 pages, Sep. 15, 2008.

* cited by examiner

MULTI-SOURCE DISTRIBUTED NAVIGATION SYSTEM ARCHITECTURE

RELATED APPLICATIONS

The present application is a continuation of U.S. application Ser. No. 16/177,419, entitled "Multi-Source Distributed Navigation System Architecture" and filed Oct. 31, 2018, which is a continuation-in-part application of U.S. application Ser. No. 15/494,898, entitled "Multi-Source Distributed Navigation System Architecture" and filed Apr. 24, 2017, which are hereby incorporated by reference in their entireties.

TECHNICAL FIELD

The present invention relates to navigation system architectures, and more particularly, to distributed navigation system architectures with multiple platforms.

BACKGROUND

Objects or navigation platforms, such as airplanes, motor vehicles, and naval vessels, use navigation systems to navigate to desired destinations. These navigation systems are typically dependent on GPS-aided inertial navigation systems (INS), which include performance errors, such as drift. Although some navigation systems add other aiding mechanisms, such as RF aids, celestial sightings, or magnetic compass, the combination of aiding mechanisms do not provide better updates than the GPS/INS system alone.

SUMMARY OF THE EMBODIMENTS

In accordance with one embodiment of the invention, a distributed navigation system includes a plurality of navigation platforms, each navigation platform having a universal navigation processor configured to communicate with other universal navigation processors over distribution channels in a communication network. The distributed navigation system also includes one or more relative navigation systems, in communication with the universal navigation processors, configured to provide source information to the navigation platforms. The distributed navigation system further includes one or more navigation filters provided on one or more of the universal navigation processors, each navigation filter configured to process the source information, an anchor navigation node disposed on one or more of the plurality of navigation platforms in order to form one or more anchor navigation platforms. The anchor navigation node includes an inertial navigation system, a clock, and one or more absolute navigation systems and is configured to determine navigation information based on the inertial navigation system, the clock, the one or more absolute navigation systems and the source information. The one or more anchor navigation platforms provide the navigation information over the distribution channels to the other navigation platforms in the communication network. The distributed navigation system further includes a navigation processor system in communication with each of the universal navigation processors in the communications network in order to provide operating information updates to the universal navigation processors and a graphical user interface configured to display the navigation information to a user and permit the user to review and control the navigation information.

In related embodiments, the graphical user interface may be disposed on at least one of the one or more anchor navigation platforms. At least one of the one or more navigation filters may include (a) a situation module configured to provide situation data, (b) an information module configured to determine an estimate of the quality and an estimate of the integrity of the source information, at a given time, based on the source information received from one or more data sources and based on the situation data received from the situation module, (c) an integrity monitor module configured to receive the estimate of the quality and the estimate of the integrity of the source information from the information module and to receive the source information from the one or more data sources, configured to determine the integrity and the quality of the source information based on the estimate of the quality and the estimate of the integrity of the source information from the information module, and configured to validate the source information based on (1) the integrity of the source information, and/or (2) the quality of the source information, and (d) a navigation state estimator configured to determine the navigation information of the one or more navigation platforms based on the source information that was validated and corresponding quality of the source information received from the integrity monitor module. The situation module may be configured to receive, from the graphical user interface, an instruction from the user and to provide the instruction to the information module as situation data. The instruction may modify a mission plan to maximize performance of one or more of the plurality of navigation platforms or modify a mission plan to maintain an estimated arrival time at a destination of one or more of the plurality of navigation platforms. The situation data may be based on past or current performance of the one or more data sources or one or more of the plurality of navigation platforms or may be based on past or current performance of the one or more data sources or one or more of the plurality of navigation platforms in a geographical region that overlaps with a mission plan. The situation module may receive the situation data from databases with stored situation data previously known, from communication links with updated situation data that changes over time, from the one or more data sources, from detection systems that provide the situation data based on detected conditions, and/or from a user that inputs modifications to the situation data. The situation data may include environment conditions, position information, velocity, attitude, temporal information, platform configuration, mission phase, data source location, system health, mission plan, threat data, condition of a threat, threat operating capabilities, threat location, temperature, cloud cover, visibility, barometric pressure, terrain, time of year, tides, radiation environment, population, city information, street information, building information, known transmitters, known vehicles, visible stars, and/or location of satellites in the sky. The graphical user interface may be configured to display a modification generated autonomously by an anchor navigation platform. The modification may include changes to a mission plan to maximize performance of one or more of the plurality of navigation platforms or may include changes to a mission plan to maintain an estimated arrival time at a destination of one or more of the plurality of navigation platforms. The graphical user interface may be configured to display information related to past or current performance of one or more of the plurality of navigation platforms conducting a mission. The graphical user interface may be configured to display contributions from the one or more data sources to the navigation information for one or more of the plurality of navigation platforms conducting the mission. The navigation information may include position, velocity, altitude, errors in position, errors in velocity, errors in attitude, time, clock errors, propagation delays, GPS satellite errors, sensor errors, sensor characterization parameters or any combination thereof. The one or more absolute navigation systems may include a global positioning system (GPS), a celestial object sighting system (COSS), a magnetic compass, and/or an RF sensor system. The one or more relative navigation systems may include a vision system having an image sensor. The plurality of navigation platforms may include moving and non-moving platforms.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Navigation platform" refers to an object that may move, such as an aircraft, a vehicle, a naval vessel, etc. and a stationary object, such as a building or base, etc., that uses navigation information.

"Navigation information" may include the geolocation position, velocity, altitude, errors in position, errors in velocity, errors in attitude, time, clock errors, propagation delays, GPS satellite errors, sensor errors, and/or sensor characterization parameters, by way of example.

"Data source" refers to a source of data that provides information that may be used to determine the navigation information of one or more objects.

"Source information" refers to information provided by a data source.

"Integrity of source information" refers to a measure of source information related to whether the source information is trustworthy and from a data source that is performing as intended, e.g., the data source is not subjected to interference or jamming, and thus the source information is not altered in some way.

"Quality of source information" refers to a measure of source information related to whether a data source is providing the source information according to its specifications without any degradation, or a measure of source information that specifies the accuracy of the source information at a given time.

An "absolute navigation system" includes navigation systems such as a Global Positioning System (GPS) and/or Celestial Object Sighting System (COSS) that provide absolute position and current time navigation information from data sources such as satellites and celestial objects.

A "relative navigation system" includes navigation systems such as vision systems that provide relative position and current time navigation information from data sources such as man-made landmarks, e.g., buildings, streets, etc., and/or terrestrial landmarks, e.g., mountains, bodies of water, etc.

Distributed Navigation System Architecture

Figure 1:
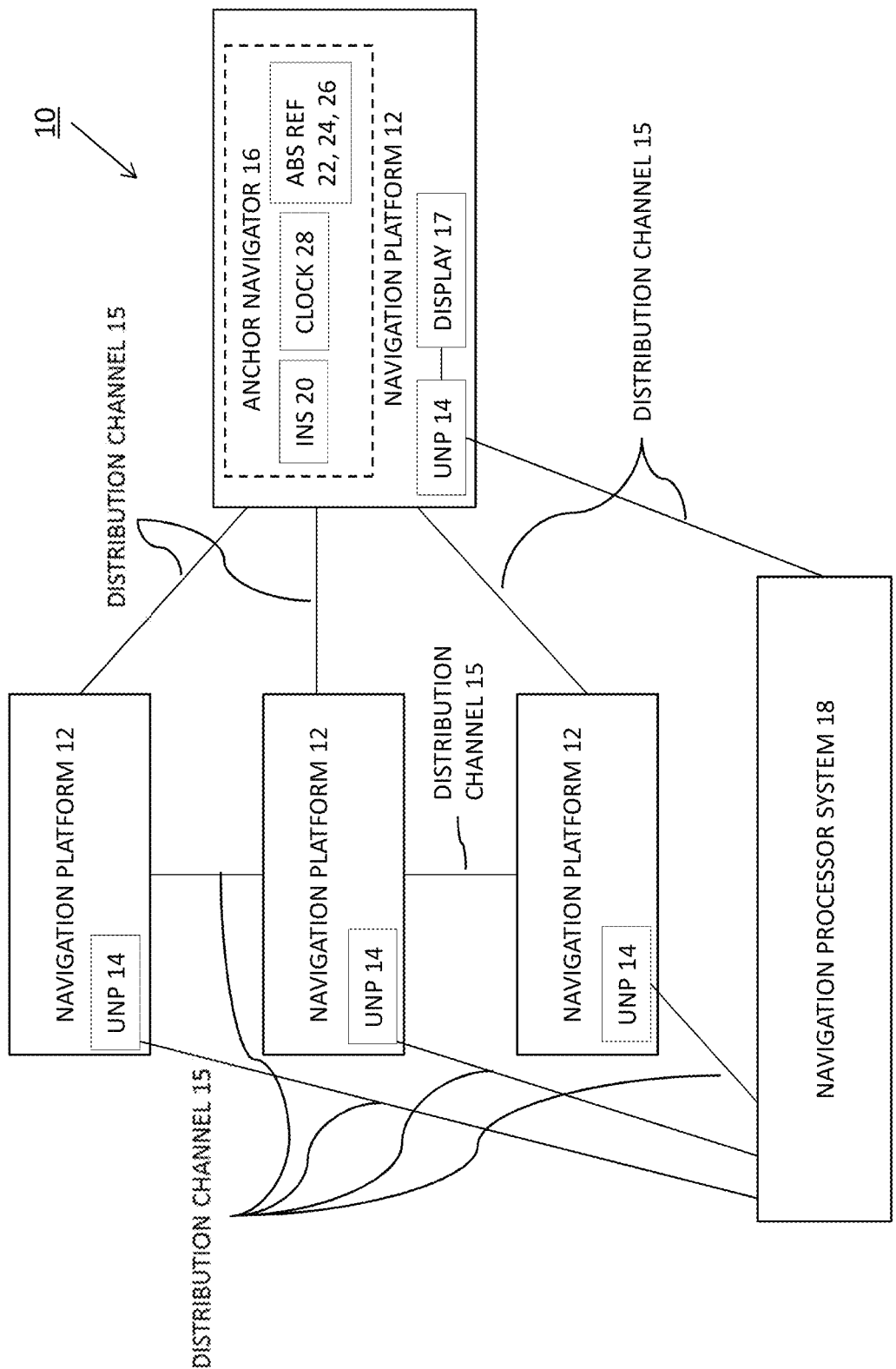
FIG. 1 schematically shows a distributed navigation system architecture according to embodiments of the present invention.

FIG. 1 schematically shows a distributed navigation system architecture 10, according to embodiments of the present invention, that includes a plurality of navigation platforms 12. The distributed navigation system architecture 10 may include moving navigation platforms 12, non-moving navigation platforms 12, or a combination thereof. The moving navigation platforms 12 may be assigned to one or more missions. Each navigation platform 12 has a universal navigation processor 14 configured to communicate with other universal navigation processors 14 over distribution channels 15 in a communication network.

Figure 2:
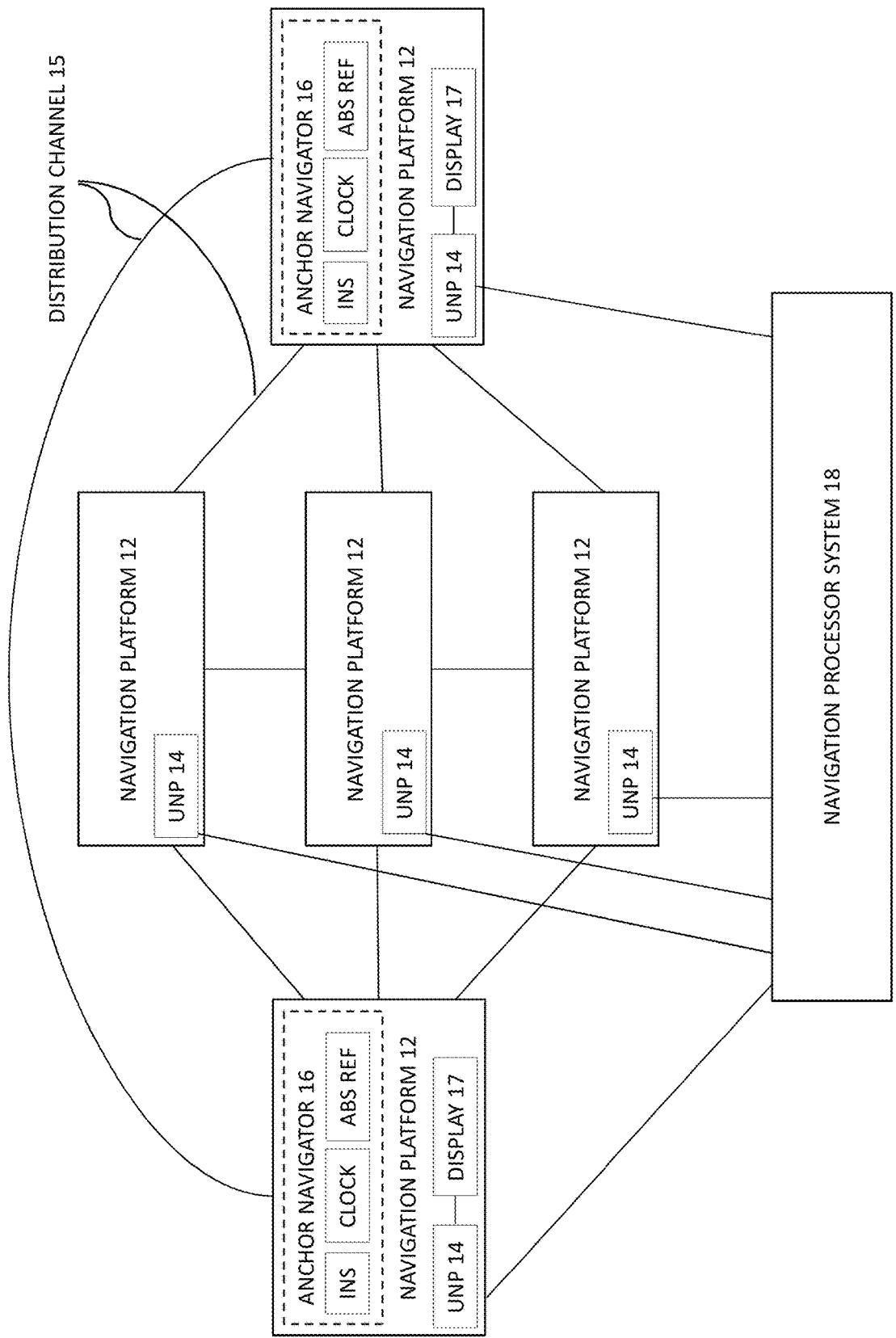
FIG. 2 schematically shows another distributed navigation system architecture according to embodiments of the present invention.

The distributed navigation system architecture 10 further includes an anchor navigator 16 or anchor navigation node disposed on one or more of the plurality of navigation platforms 12 in order to form one or more anchor navigation platforms. The anchor navigator 16 includes an inertial navigation system 20, a clock 28, and one or more absolute navigation systems 22, 24, 26 and is configured to determine navigation information based on the inertial navigation system, the clock, the one or more absolute navigation systems and optionally source information from one or more relative navigation systems. As shown in FIG. 1, the universal navigation processor 14 of the anchor navigator 16 is configured to have a graphical user interface with a display 17. The graphical user interface may display, for example, navigation information for the user of the anchor navigator 16 to review and optionally control. The graphical user interface may be configured to accept user inputs, such as additional situational data as described in more detail below. For example, the user inputs may make modifications to a mission plan, which in turn modifies the navigation information. FIG. 1 shows a distributed navigation system architecture 10 with one navigation platform 12 having an anchor navigator 16 and FIG. 2 shows a distributed navigation system architecture 10 with two navigation platforms 12 having an anchor navigator 16. Although FIGS. 1 and 2 show three navigation platforms 12 with one or two anchor navigation platforms, any number of the navigation platforms 12 may be used, and any number of navigation platforms 12 may include an anchor navigator 16.

Figure 3:
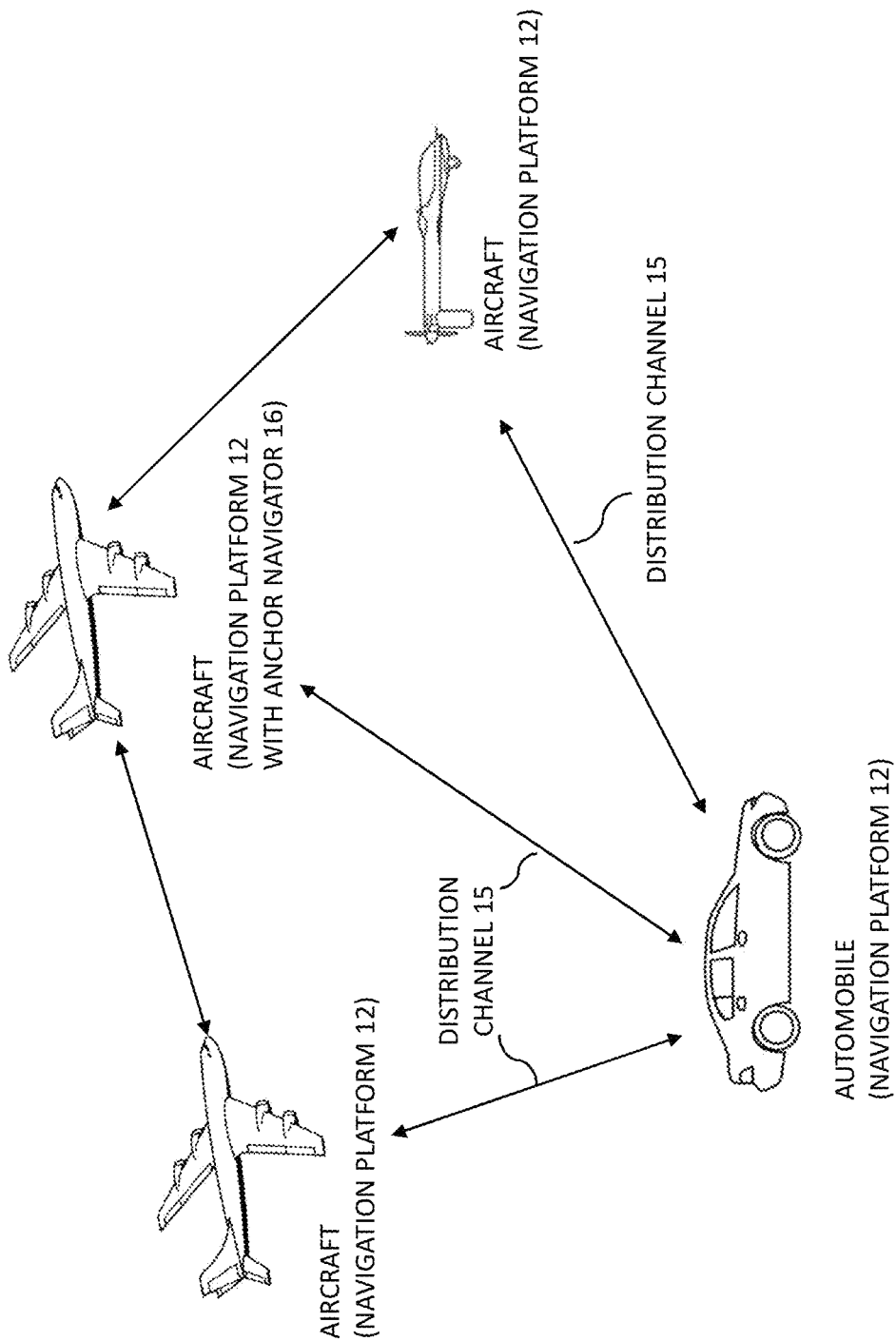
FIG. 3 schematically shows various navigation platforms in a distributed navigation system architecture according to embodiments of the present invention.

The one or more navigation platforms 12 with the anchor navigator 16, i.e., the anchor navigation platforms, know its own position and current time to within GPS precision at all times regardless of which navigation aiding sensors or data sources 105 are available or regardless of which distribution channels 15 are open. The one or more anchor navigation platforms provide its navigation information to the other navigation platforms 12 in the communication network that do not include an anchor navigator 16 or anchor navigation node. For example, FIG. 3 schematically shows exemplary navigation platforms 12 that include an anchor navigator 16 and do not include an anchor navigator 16 in a distributed navigation system architecture 10.

The distributed navigation system architecture 10 further includes a navigation processor system 18 in communication with each of the universal navigation processors 14 in the communications network in order to provide operating information updates to the universal navigation processors 14. For example, software updates may be sent from the navigation processor system 18 to the universal navigation processors 14 on a periodic basis. The software updates that are sent to the universal navigation processors 14 may include process information for determining and/or estimating navigation information as discussed in more detail below. In various embodiments, the program code for the universal navigation processors 14 may also relate to how the navigation platforms 12 distribute information among the navigation platforms 12 in the network. Furthermore, the program code may relate to protocols for communication among the navigation platforms 12.

The distributed navigation system architecture 10 may be used as a baseline architecture for all future distributed navigation system designs, irrespective of how many aiding modalities are incorporated into the architecture or how many navigation platforms 12 and distribution channels 15 are used in the communication network. The individual navigation platforms 12 may include their own dedicated sensors or data sources 105 and may be added to or removed from the distributed navigation system architecture 10 with minimal effort since software code does not need to be revised when scaling up to a large distributed navigation system architecture. Embodiments of the present invention provide a unique distributed navigation system architecture that includes absolute (e.g., global positioning system (GPS)-class positioning and time) navigation information to all navigation platforms 12 within the network when GPS is present, and also includes GPS-alternative navigation information to all navigation platforms 12 when GPS is not present or the navigation platforms 12 are not updated with the navigation information from the anchor navigation platform(s) by combining absolute navigation systems (e.g., GPS and/or celestial object sighting system (COSS) with other aiding modalities, such as magnetic compass and/or an RF sensor system) with relative navigation systems (e.g., vision systems). The distributed navigation system architecture 10 uses the common universal navigation processor 14 on all of the navigation platforms 12, which permits large numbers of navigation aiding modalities and network nodes to be used in an efficient state fusion based approach that achieves nearly optimal performance with minimal computational effort.

The Navigation Platforms

Figure 4:
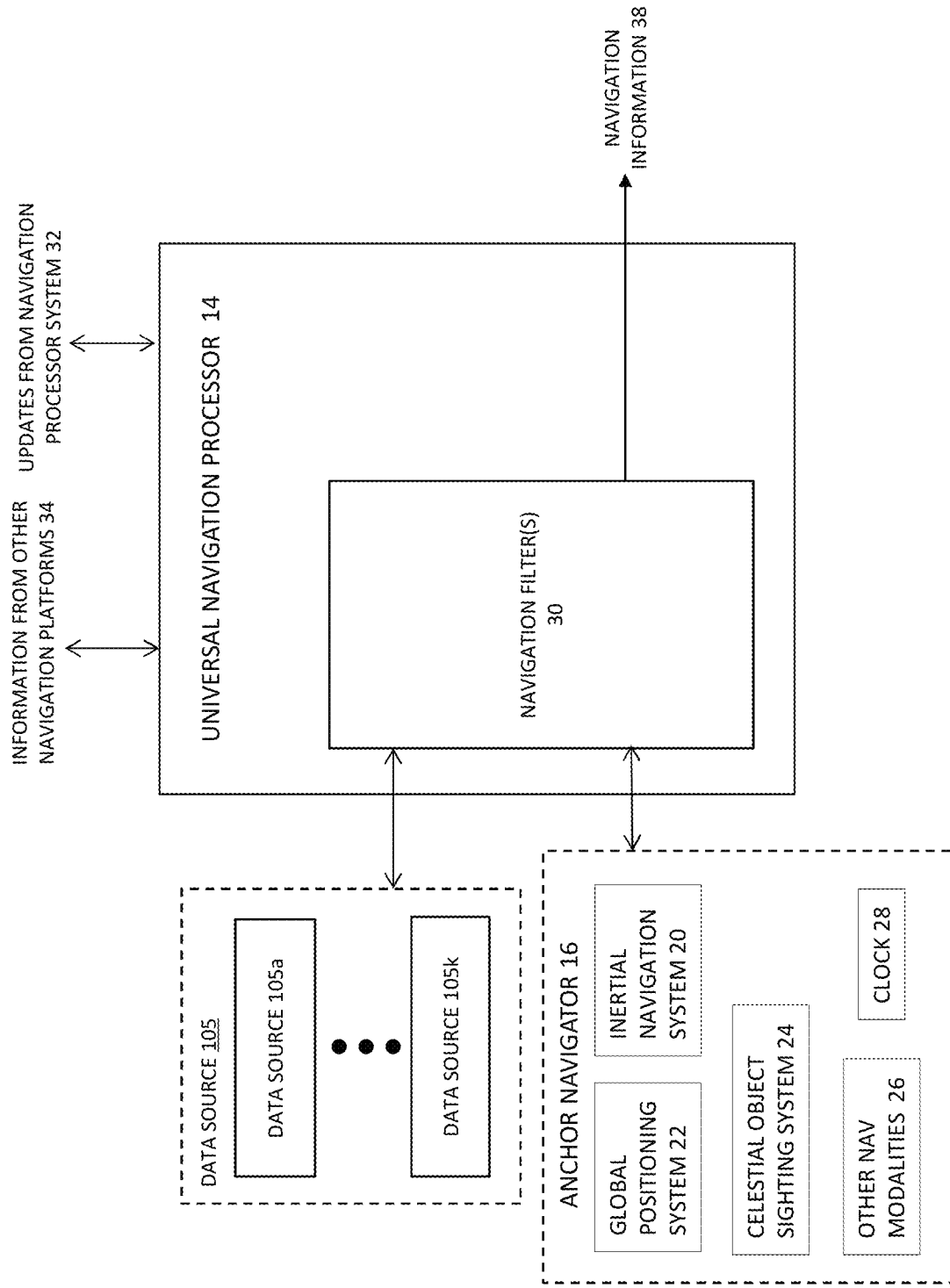
FIG. 4 schematically shows a navigation platform with an anchor navigator in a distributed navigation system architecture according to embodiments of the present invention.
Figure 5:
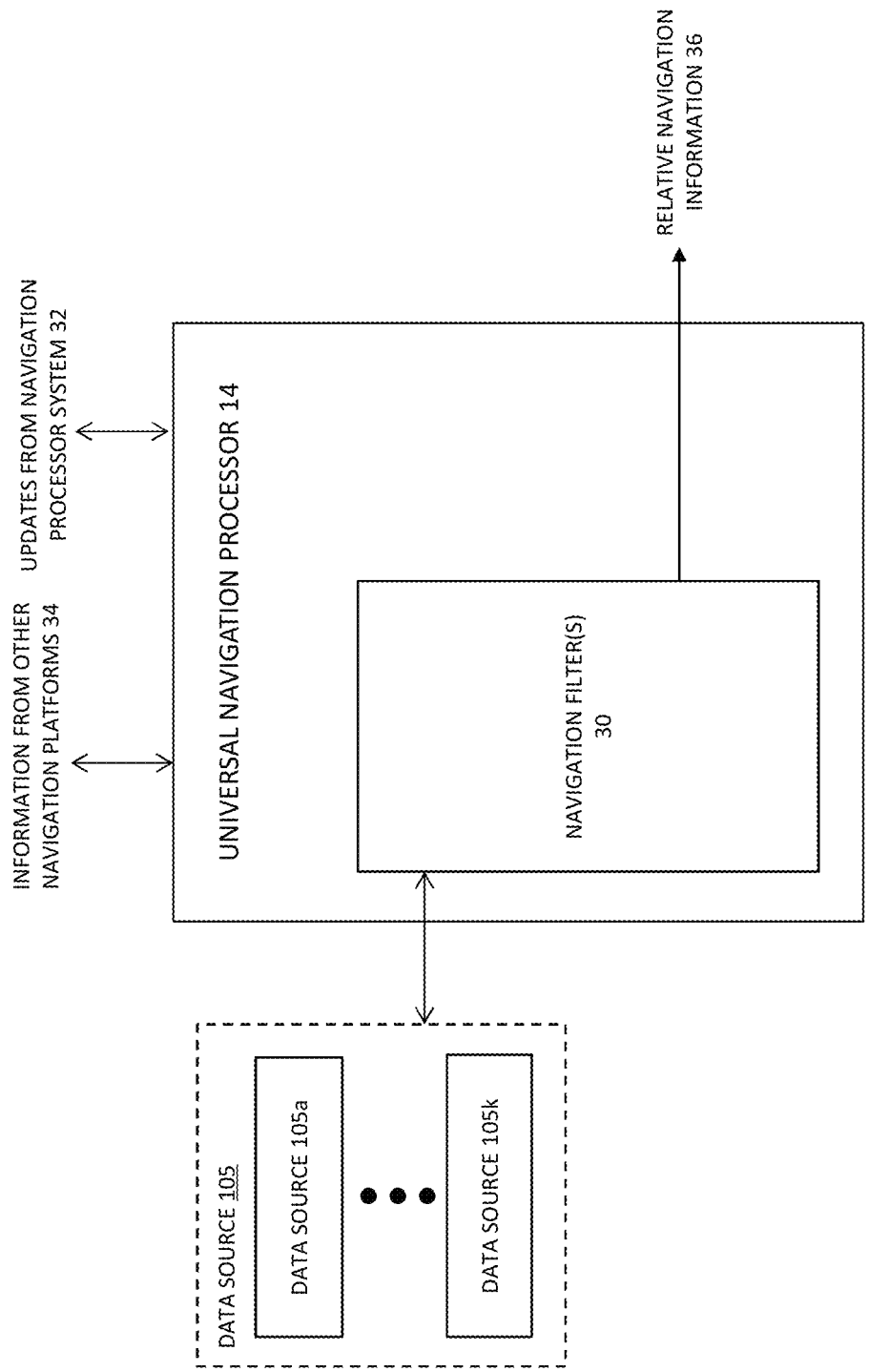
FIG. 5 schematically shows a navigation platform in a distributed navigation system architecture according to embodiments of the present invention.

FIG. 4 schematically shows a navigation platform 12 with an anchor navigator 16 and FIG. 5 schematically shows a navigation platform 12 that does not include an anchor navigator 16 in a distributed navigation system architecture. As mentioned above, the anchor navigator 16 includes an inertial navigation system 20, a clock 28, and one or more absolute navigation systems 22, 24, 26. For example, the inertial navigation system 20 may include accelerometers and/or gyroscopes. The clock 28 may enable the anchor navigator 16 to update or synchronize the time associated with the navigation information with an external clock. Exemplary clocks include atomic clocks, microwave transition clocks, optical transition clocks, and/or astronomic-based clocks (e.g., pulsar). The one or more absolute navigation systems 22, 24, 26 may include a global positioning system (GPS) 22 that requests and receives navigation information from one or more satellites or data sources 105 in a satellite system, a celestial object sighting system (COSS) 24 that receives navigation information from one or more celestial objects or data sources 105, or other navigation modalities 26, such as an RF sensor system and/or magnetic compass that communicate with data sources 105 to provide navigation information for the navigation platforms 12.

Any of the navigation platforms 12 may become anchor navigation platforms depending on the network and distributed navigation system architecture application. For example, a first navigation platform 12 may initially be an anchor navigation platform in the network and then a second navigation platform 12 may become an anchor navigation platform instead of, or in addition to, the first navigation platform 12.

Each of the universal navigation processors 14 in the anchor navigation platform or the other navigation platforms 12 includes a navigation filter 30 configured to process source information from one or more data sources 105 or from data sources 105 associated with the absolute navigation systems 22, 24, 26 to estimate the navigation information for one or more navigation platforms 12. The universal navigation processor 14 may store previously estimated navigation information for the navigation platforms 12 in memory or storage, estimate a relative change in navigation information based on at least source information from the data sources 105, and update the estimated navigation information accordingly.

The navigation filters 30 may include an extended Kalman filter, a particle filter, a nonlinear moment filter, a Hidden Markov Model, and/or a Bayesian filter. The universal navigation processor 14 may implement vision-based odometry from a relative navigation system that includes a vision sensor. For example, the vision sensor may be used to capture a succession of images e.g., images of a man-made landmark and/or terrestrial landmark, and then the image information used to interpolate a change in the geolocation position of the navigation platform 12. For example, the universal navigation processor 14 may identify one or more features that are present in a series of images to track. For instance, if the navigation platform 12 is an aircraft flying over a segment of a river, the universal navigation processor 14 may select a particular bend in the river as the feature to track. The universal navigation processor 14 may determine the changing position of the bend in the river in successive images until the feature disappears, and apply the navigation filter 30 to this data to estimate a change in the geolocation position of the one or more navigation platforms 12. In another example, the aircraft may be flying by a mountain range and the universal navigation processor 14 may select a particular mountain peak as the feature to track. The universal navigation processor 14 may apply the navigation filter 30 to the changing position of the selected peak.

In another example, the universal navigation processor 14 may receive source information from the inertial navigation system 20, e.g., accelerations and angular rates from accelerometers and gyroscopes, and integrate this source information over a period of time to estimate a relative change in the geolocation position of the one or more navigation platforms 12. However, accelerations and angular rates inherently exhibit drift errors (e.g., misalignment and bias errors) which can compound over time. As a result, the accuracy of the estimated relative change in the geolocation position may deteriorate over time. To compensate for the drift errors, the one or more navigation platforms 12 receive navigation information from the other navigation platforms 12, such as the anchor navigation platform and/or other navigation platforms 12.

In some embodiments, data sources 105 that provide source information may be located on and/or distributed across multiple navigation platforms 12. Alternatively, or in addition, data sources 105 may be found in different parts of the environment, such as underground, underwater, terrestrially, in the atmosphere, and/or in space.

Overview of the Navigation Filter System

Figure 6:
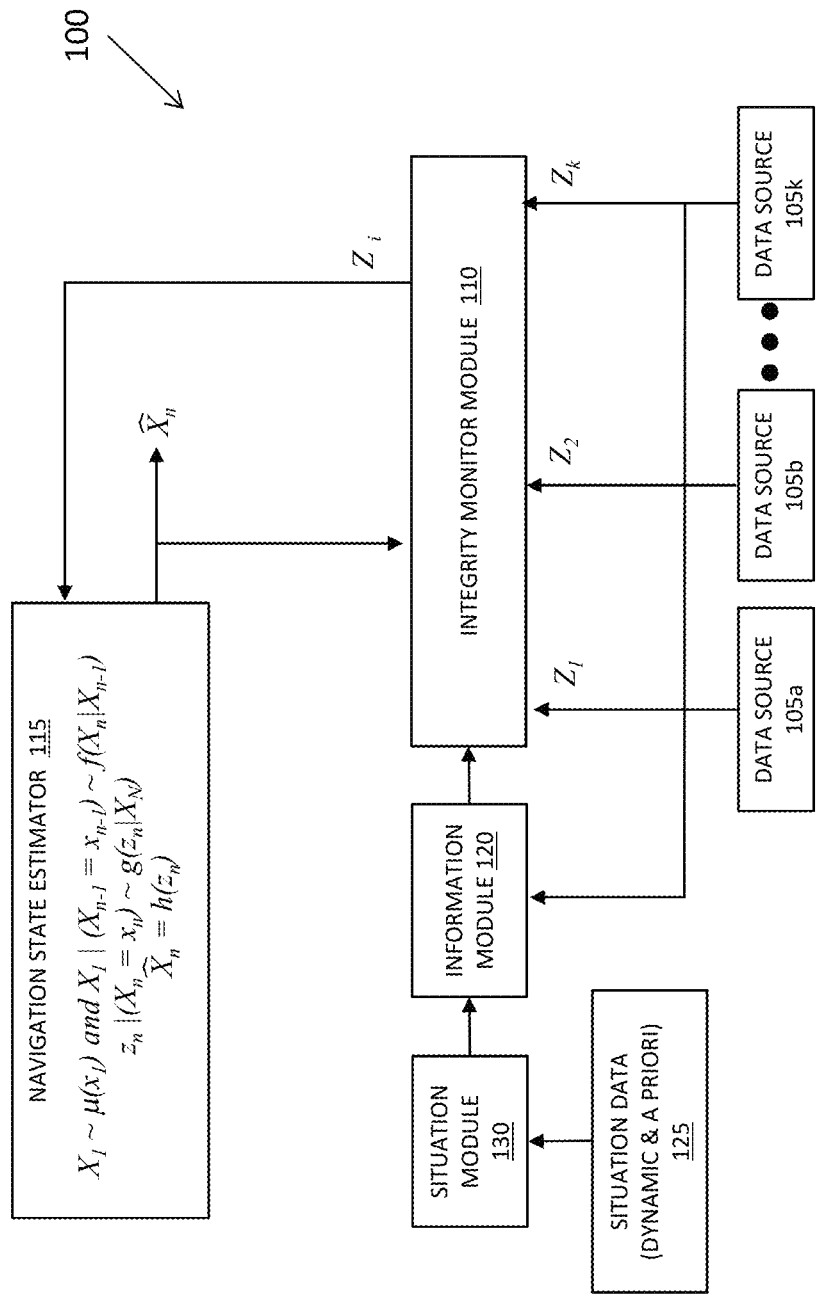
FIG. 6 schematically shows a navigation filter used within a universal navigation processor according to embodiments of the present invention.
Figure 7:
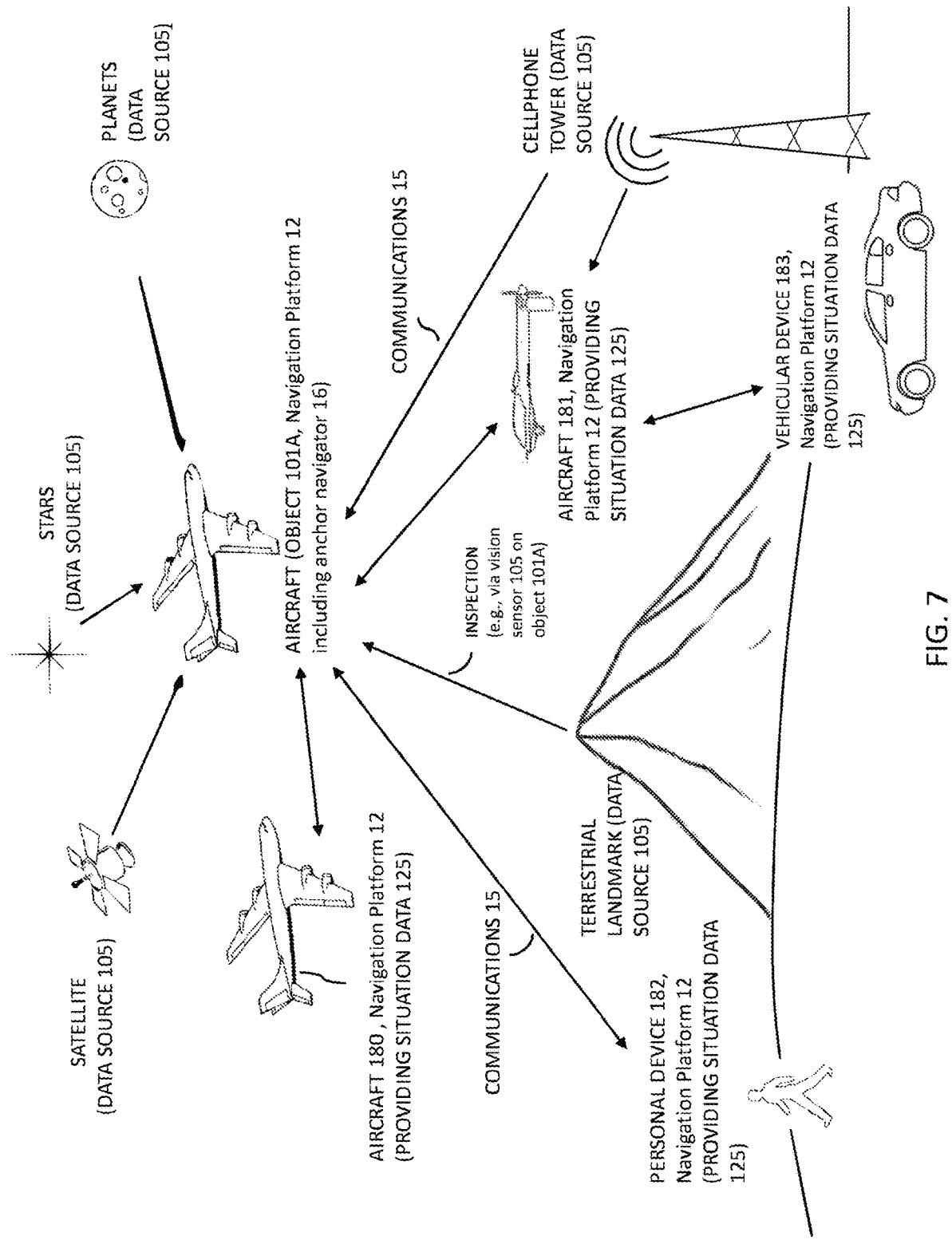
FIGS. 7, 8 and 9 schematically show a distributed navigation system architecture using a navigation filter and environments in which the architecture may operate according to embodiments of the present invention.
Figure 8:
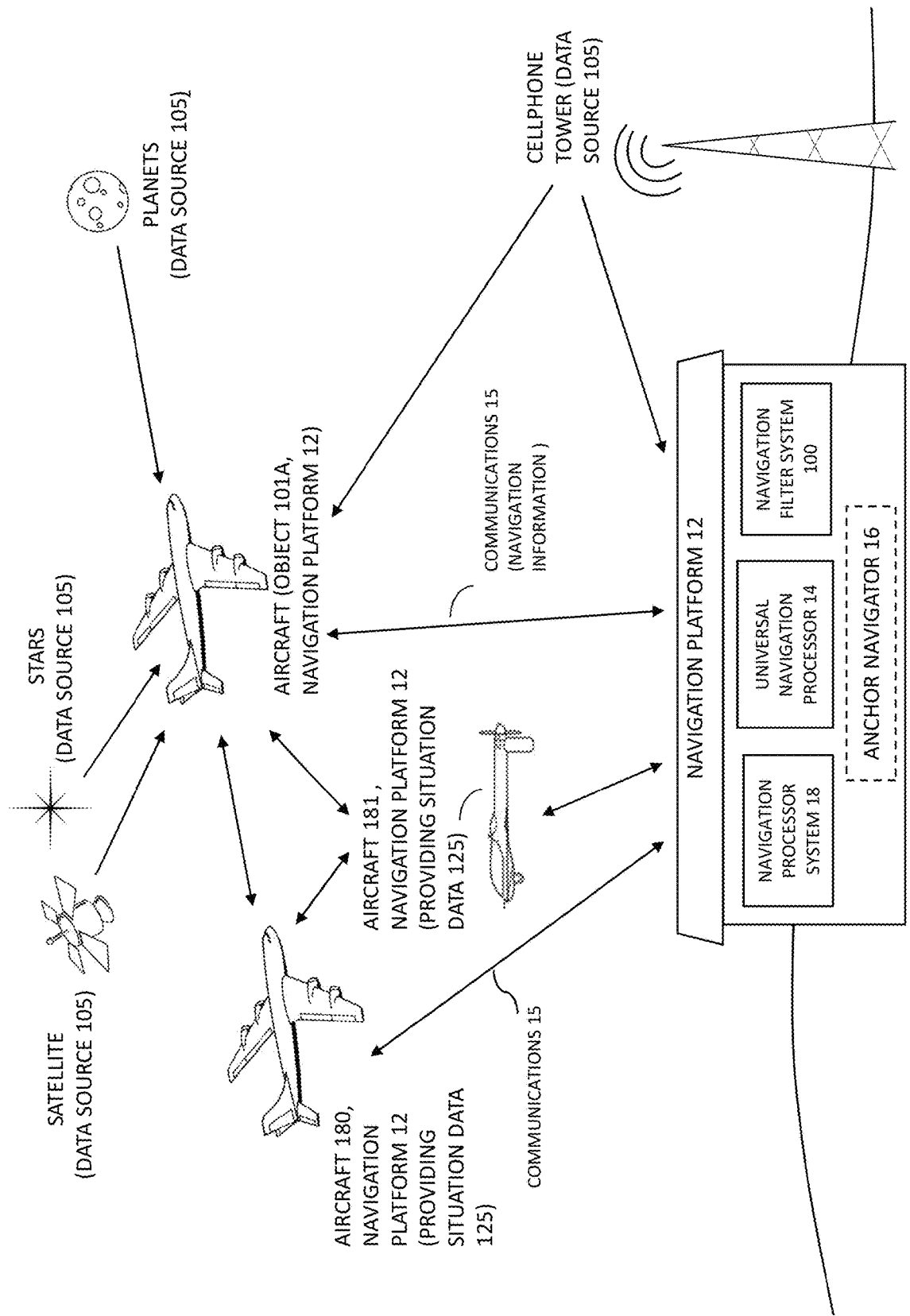
Figure 9:
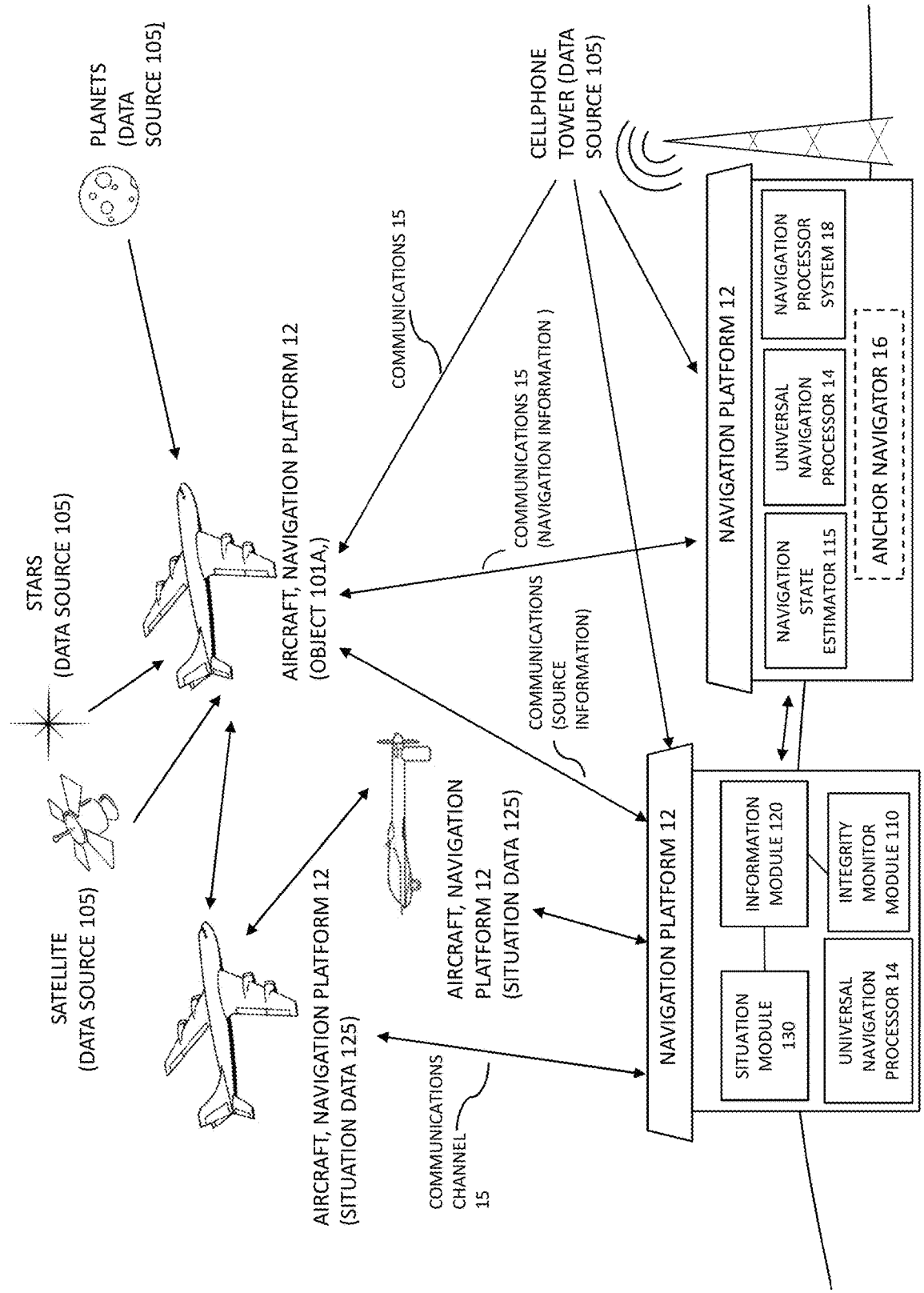

FIG. 6 schematically shows a navigation filter system 100 that may be used as the navigation filter 30 within the universal navigation processor 14 for determining navigation information for one or more navigation platforms 12 using source information validated on the basis of its quality and/or integrity, and FIGS. 7-9 schematically show a distributed navigation system architecture 10 using a navigation filter system 100 and environments in which the architecture may operate. The navigation filter system 14 is described in U.S. patent application Ser. No. 15/435,412 filed on Feb. 17, 2017, which is incorporated by reference herein in its entirety.

Embodiments of the navigation filter system 100 provide the best possible navigation information resulting from several data sources 105 or sensors, for example, in an environment in which one or more of those sources may be challenged, contested, degraded, or denied and, preferably, to do so without human intervention. Data sources in such an environment may provide widely varying navigation information quality and integrity depending on the challenges presented by the environment. In addition, the source information provided by some of the data sources may be challenged or compromised, such that the data sources have good perceived quality but, in fact, lack integrity, e.g., the source information has been compromised or altered in some way. Embodiments of the present navigation filter system 100 are capable of identifying both the quality and integrity of data sources based on the environment and using this quality and integrity information in the navigation information accordingly. In addition, identification of quality and integrity of data sources is not static but instead may change over time depending on many factors, e.g., mission phase, location, and system health. Embodiments of the present navigation filter system 100 maintain awareness of the situation in which the data sources 105 are operating and maintain information model(s) describing the dynamic and probabilistic state of the source information when the situation in which the source information is obtained is fully known and a probabilistic state representing the uncertainty associated with the source information when the situation is uncertain.

For example, in both government organizations and commercial enterprises, navigation information is critical for successfully completing particular objectives. For instance, pilots and/or drones conducting missions on behalf of the military or intelligence agencies must know their geolocation positions to obtain meaningful information. Extraction teams tasked with rescuing civilian and military hostages must track their geolocation positions and times to ensure that they reach their targeted destination at the designated times. Autonomous robots deployed to search, unearth, and/or defuse land mines in previously war-torn regions risk triggering explosions if they fail to evade known land mines. Commercial pilots conducting transoceanic flights must rely on their instruments for geolocation position because their environments may generally lack identifying geographical features (e.g., mountain ranges, distinct coast lines). Energy companies may send autonomous vehicles into remote and/or dangerous environments to repair or maintain equipment.

Although the Global Positioning System (GPS) is the most commonly used absolute navigation system for providing a navigation platform with its navigation information, the GPS system is not always available or may be unreliable. For example, in some situations, the navigation platform 12 may be proximate to an insufficient number of GPS satellites. In other situations, a particular environment may interfere with the navigation platform's ability to communicate with the satellites, despite their number and location (e.g., mountains that deflect or degrade signals). Further, a navigation platform 12 may be subject to other types of interference, such as hostile organizations intent on spoofing or jamming GPS signals to prevent the navigation platform from obtaining accurate navigation information.

Redundant navigational capabilities decrease a navigation platform's vulnerability to erroneously determined navigation information. Other data sources 105, such as data sources from relative navigation systems, may supplement and/or replace GPS signals in determining the navigation information. However, depending on the navigation platform's situation, information from one or more of these data sources may be unreliable. Like GPS, these data sources may function improperly and thereby output source information of dubious integrity, and they are also vulnerable to external interference. Thus, additional data sources may not, in and of themselves, guarantee more accurate navigation information. Furthermore, because the reliability of any given data source 105 changes dynamically based on the data source's situation, ensuring that reliable source information is solely used to determine navigation information becomes a more challenging endeavor.

Embodiments of the present invention evaluate source information from one or more data sources 105 and situation data to determine which data sources 105 can be relied on for determining the navigation information of one or more navigation platforms 12. Referring to FIG. 6, the navigation filter system 100 includes multiple data sources 105 (shown as 105a, 105b, . . . , 105k) that provide source information that may be used to determine a navigation platform's navigation information. Because one or more of the data sources 105 may not be reliable at any given time, the navigation filter system 100 may use a situation module 130, an information module 130, an integrity monitor module 110, and a navigation state estimator 115, as described in more detail below, to identify the data sources 105 that should be relied on.

In particular, the situation module 130 provides situation data 125 related to the data sources' situation, and the situation module 130 may aggregate the situation data 125 and send it to the information module 120. The information module 120 creates and/or maintains statistical models for estimating the quality and/or integrity of source information from any given data source 105, and uses these models with the situation data (and in some scenarios, source information as well) to determine the estimates of quality and integrity. The information module 120 provides the estimates to the integrity monitor module 110.

The integrity monitor module 110 makes the final determination of the data sources 105 that, at that particular time, should be relied on to determine the navigation information for the plurality of the navigation platforms (also referred to herein as "validating" the information from a particular data source). The integrity monitor module 110 may validate any source information based on its integrity and/or quality, and may further determine integrity and/or quality based on information from the data sources 105 (e.g., the source information, quality of the source information, integrity of the source information), information from an information module 120 (e.g., an estimate of the quality and/or an estimate of the integrity of the source information, at a given time), or both.

The integrity monitor module 110 sends the validated source information to the navigation state estimator 115, and in some embodiments, the integrity monitor module 110 refrains from sending source information that has not been, and will not be, validated. The navigation state estimator 115 uses the validated source information to determine the navigation information, which may be transmitted to the one or more navigation platforms 12. In some embodiments, the navigation state estimator 115 may also transmit the navigation information to a display 17 for a user to view and optionally control the navigation information or to other systems, e.g., within one or more of the navigation platforms 12 (not shown). Furthermore, the navigation state estimator 115 may transmit the navigation information back to the integrity monitor module 110, where it may be used to validate subsequent source information received from the data sources 105 and/or information module 120.

As shown in FIGS. 7-9, the various components of the navigation filter system 100 may be located on one or more navigation platforms 12 in one or more locations. For example, the situation module 130, information module 120, integrity monitor module 110, and/or navigation state estimator 115 may be coupled to a navigation platform 12 having the anchor navigator 16 (as shown in FIG. 8) and/or may be remotely located from the anchor navigation platform on another navigation platform 12, e.g., on a moving or non-moving navigation platform 12. Alternatively, the components of the navigation filter system 100 may be distributed across multiple navigation platforms 12 (as shown in FIG. 9), e.g., on moving platforms and/or non-moving platforms 12.

As mentioned above and shown in FIGS. 1 and 2, the universal navigation processors 14 of the anchor navigators 16 may include graphical user interfaces with displays 17 for a user to review the navigation information and optionally control the navigation information. Although the anchor navigation platforms are shown with the displays 17, any of the navigation platforms 12 in the distributed navigation system architecture 10 may include a graphical user interface with a display 17, although the ability to control the navigation information through the display 17 may be limited to just selected navigation platforms, e.g., one or more anchor navigation platforms.

For example, the graphical user interface may accept user inputs to modify situation data, e.g., to modify a mission plan. The graphical user interface may display one or more objectives for the modifications. In response to user selection of at least one objective, the universal navigation processor 14 may send the modifications as situation data 125 to a situation module 130, and a navigation filter 30 may use this information (as explained above) to provide updated navigation information to the one or more navigation platforms 12 that may be conducting the mission.

One objective may be to maximize the performance of the one or more navigation platforms 12. For example, during a prior, completed mission, the data sources 105 and/or one or more navigation platforms 12 may have performed poorly in one or more particular geographical regions, and thus caused one or more navigation platforms 12 conducting the mission to be inefficient, e.g., take longer than expected or not reach the right destination. Upon receiving updated navigation information from an anchor navigator 16, the navigation platform 12 adjusts its navigation information, e.g., direction and/or velocity, to improve the performance of the one or more navigation platforms 12.

Another objective for modifying situation data 125, such as a mission plan, may be to maintain the expected completion time of the mission (e.g., expected arrival time at the destination). Because the conditions under which a navigation platform 12 operates during a mission may result in errors or inefficiencies, costing the navigation platform 12 additional time to get to its destination, the universal navigation processor 14 may provide historical performance of the data sources 105 and/or one or more navigation platforms 12 at different locations along the route. The historical performance data may be supplied as situation data 125 to the situation module 130 and a navigation filter 30 may use this information to provide updated navigation information to the one or more navigation platforms 12 to maintain the expected completion time of the mission.

Alternatively, instead of selecting one or more objectives from a display 17 of a graphical user interface, the user may directly input modifications to situation data 125, e.g., modifications to the mission plan, which ultimately modifies the navigation information provided to the one or more navigation platforms 12. For example, the user may change one or more portions of the mission plan to avoid particular geographical regions, such as regions projected to experience dangerous weather conditions during the mission. In another example, the user may delay the estimated departure time for the mission, or alter the velocity and/or altitude at which a navigation platform 12 may travel. As mentioned above, the modifications may be sent as situation data 125 to a situation module 130, and a navigation filter 30 may use this information to provide updated navigation information to the one or more navigation platforms 12.

In further embodiments, the universal navigation processor 14 of the anchor navigator 16 may be configured to modify situation data 125, e.g., the mission plan, based on any of the objectives presented to the user in the graphical user interface. The universal navigation processor 14 may also be configured to automatically modify mission plans. The universal navigation processor 14 may modify the mission plan, e.g., within a predetermined period of time before the expected departure time of the mission, to ensure that the modifications are based on the most updated navigation information from the navigation filter 30. For example, the universal navigation processor 14 may be configured to modify all mission plans originating from the same location as its anchor navigator 16 when the situation data shows that particular geographical regions have become, or are expected to become, unsafe for travel. In this case, the navigation information may reroute one or more navigation platforms 12 and/or abort the mission altogether to avoid unacceptable risks to personnel.

The universal navigation processor 14 of the anchor navigator 16 may send the modifications to the situation data 125 to a situation module 130, and a navigation filter 30 may use this information to provide updated navigation information to the one or more navigation platforms 12. The modifications may be sent to one or more navigation platforms 12 that are conducting the mission and/or to one or more navigation platforms 12 that will communicate with the navigation platforms 12 that are conducting the mission, such as stationary navigation platforms 12 or navigation platforms 12 positioned along the route of the mission.

The one or more navigation platforms 12 may periodically receive updated navigation information, which implements changes to the mission plan, and additional navigation information that may be generated before, during and/or after the mission. One or more anchor navigation platforms and/or one or more navigation platforms 12, e.g., platforms conducting the mission, may provide situation data 125 concerning the mission to the graphical user interface before, during and/or after the mission. The display 17 may show a comparison of the absolute navigation information to the navigation information determined by one of its navigation filters 30, and the user may review and assess the performance of the data sources 105 and/or the one or more navigation platforms 12.

For example, the user may review and evaluate, for every data source 105, its respective contribution to the determined navigation information. For instance, the display 17 may show the contribution from a satellite 105, a celestial object sighting system (COSS) 24, an RF sensor system 105, a magnetic compass 105, or any of the other data sources 105 described herein. The display 17 may show the current and/or past performance of the data sources 105 and/or the one or more navigation platforms 12 to the user. The user may evaluate the overall performance of one or more navigation platforms 12, and the performance of individual data sources with respect to its integrity and/or quality, and decide to control the navigation information.

The display 17 may show a comparison between the current performance and past performance of the data sources 105 and/or the one or more navigation platforms 12 (i.e., performance during previously completed missions) for the same geographical region. The universal navigation processor 14 may store situation data 125 about the performance of the data sources 105 and/or the one or more navigation platforms 12. The display 17 may show the accumulated performance data to the user.

Data Sources for the Navigation Filter System

As described above, the navigation filter system 100 for one or more navigation platforms 12 may include numerous data sources 105. A data source 105 may be any sensor or source that provides source information used to determine a navigation platform's navigation information. For example, the data sources 105 may be vision sensors, laser-based sensors, and/or GPS sensors. Other examples include chemical sensors, such as directional chemical sensors or particulate sensors. Additional exemplary sensors include gravity-based sensors (e.g., utilizing a gravimeter), RF-based sensors (e.g., utilizing radio frequency (RF) detectors, cellular detectors, WiFi detectors, Bluetooth® detectors), electromagnetic-based sensors in other parts of the spectrum (e.g., microwave detectors, X-ray detectors, electrical field strength detectors, infrared, radar), barometers, magnetic sensors (e.g., utilizing a magnetic field sensor, a magnetometer, an induction coil, a magnetic resonator, magnetic compass), torque and acceleration sensors (e.g., gyroscopes, accelerometers), force sensors (e.g., vibration sensors, pressure sensors, inertial sensors), light sensors (e.g., optical detectors, CMOS sensors, laser system detectors), acoustic sensors (e.g., sonar, ultrasound), celestial navigation sensors (e.g., star trackers), celestial objects, (e.g., stars, planets) and thermal sensors, among others. An electronic support measures (ESM) system and/or a celestial object sighting system (COSS) may also be data sources 105.

In some embodiments, data sources 105 may be located on a navigation platform 12 or distributed across multiple navigation platforms 12. Alternatively, or in addition, data sources 105 may be deployed in different parts of the environment, such as underground, underwater, terrestrially, in the atmosphere, and/or in space.

Situation Module

As described above, the situation module 130 provides the situation data 125 to the information module 120. The situation module 130 may aggregate situation data 125 before sending it to the information module 120. In some embodiments, the situation module 130 establishes communication links with external systems that provides situation data 125 regarding a navigation platform's and/or data sources' environment in real-time. In various embodiments, the situation module 130 is coupled to one or more input devices that respond to user input of situation data 125. Examples of such input devices include graphical user interfaces that may have a display 17 or manual controls.

For example, the situation module 130 may capture situation data 125 provided by external sources (e.g., communication links/distribution channels 15) regarding the integrity of particular data sources 105 (e.g., a particular sensor is known to be not operating as indicated by its quality measure or is compromised with the same result). The situation module 130 may also capture other relevant situation data 125 provided by other systems, e.g., systems on the same navigation platform 12 that include the navigation filter system 100 and/or a different navigation platform 12, such as information that may be provided by an Electronic Support Measures (ESM) system. For example, an ESM system may identify electromagnetic signals that may interfere with data sources 105, and this situation data 125 should thus be considered by the information module 120 when determining data source(s) 105 integrity and/or quality.

For example, during a mission, the navigation filter 30 may provide navigation information 36 about one or more navigation platforms 12 to the display 17 of a graphical user interface. The navigation information 36 may include the current status and projected status of the one or more navigation platforms 12 along the planned route, the situational awareness picture, including active and potential threat systems or effects along the planned route, the current and/or projected performance of the data sources 105 due to the situation or environment along the planned route. For example, the display 17 may show the data sources 105 providing source information to the navigation platform 12 and descriptions of the integrity and/or quality of each data source 105. The data sources 105 may be displayed in order of their reliability (e.g., data sources 105 providing high integrity, high quality source information first, and data sources 105 providing low integrity, low quality source information last).

The display 17 may also provide known and expected situations along the planned route, as well as the current and expected impact of the situations on the integrity and/or quality of the source information from the data sources 105. The situations may be organized according to proximity to the navigation platform 12. For example, if the mission plan has one or more navigation platforms 12 traversing a mountain range and then entering a region known to be occupied by a hostile organization, the display 17 may show these situations in that order. Within the display of situations currently applicable to the navigation platform 12, the situations may be organized by the severity of their impact on the data sources 105. For example, if the one or more navigation platforms 12 are traversing a mountainous region that is currently experiencing heavy fog and that is also known to be occupied by a hostile organization that may spoof GPS signals, then both of these situations may be shown on the display 17 as impacting the integrity and/or quality of the source information from the data sources 105. For instance, the mountains may cause the GPS signals to be intermittent and the fog may degrade the navigation platform's 12 vision sensors 105. Thus, the display 17 may show the lack of integrity of GPS signals obtained in this region due to the hostile organization and may show the lack of integrity of GPS signals and the vision sensor signals obtained in this region due to the environmental conditions. The user may review the navigation information of the one or more navigation platforms 12 on the display 17 before, during and/or after a mission and may optional control the navigation information by providing additional user inputs through the graphical user interface. For example, the user may review navigation plan modifications in order to make sure that proper performance is attained. The navigation plan modifications may be generated by the user, by the one or more navigation platforms 12 autonomously, or by some higher authority. The navigation information may be reviewed on the display 17 in several modes, e.g. maximum performance of the one or more navigation platforms 12, time-to-destination, etc. The display 17 may also have analytical tools that allow various components in the distributed navigation system architecture 10 to be monitored, e.g., IMU only, celestial data sources only, etc. and may provide a history or log of the performance of the one or more navigation platforms 12, and comparison of the current and historical performance of the one or more navigation platforms 12 in the same mission area.

Various types of situation data may include environment conditions (e.g., reports about inclement weather in a territory that the object or data source is expected to pass through), position information, temporal information, platform configuration, mission phase, data source location, system health, mission plan, threat data (e.g., an alert from a vehicle or an agency that a newly launched enemy mission has been detected within the navigation platform's or data sources' vicinity), condition of a threat, threat operating capabilities, threat location, temperature, cloud cover, visibility, barometric pressure, terrain, time of year, tides, radiation environment, population, city information, street information, building information, known transmitters, known vehicles, visible stars, and/or location of satellites in the sky, as well as any situation data that would be beneficial to the navigation filter system 100, as known by one of ordinary skill in the art. Situation data may also include any of the navigation information described herein, e.g., velocity and attitude.

In some embodiments, situation data 125 may be stored in one or more databases. The database(s) may include previously received situation data (e.g., apriori) and/or real-time situation data (e.g., dynamic). The databases may include data stored at the beginning of the navigation platform's travel. The databases may store situation data for one or more of the navigation platforms 12 and/or data source(s) for a predetermined period of time, e.g., the past three hours. As the databases receive additional situation data, the databases may overwrite some of the previously stored data or aggregate the data. In some embodiments, the databases may store different types of situation data for different lengths of time (e.g., tides for the past two hours, weather-related data for the past hour, etc.).

The Information Module

The information module 120 describes the integrity and the quality of the source information from the data source(s) 105 based on a dynamic, statistical representation of the situation data 125 in combination with the quality and integrity information supplied by the data source(s) 105 for the current time. The situation data 125 received from the situation module 130 may be based on apriori situation data, updates provided by communication links, and the source information provided by each of the data sources 105. The information module 120 creates or provides statistical models to determine an estimate of quality and/or an estimate of integrity, which the information module 120 provides to the integrity monitor module 110. The information module 120 maintains the models (e.g., profiles, statistics) of all data that may influence the navigation state estimator 115, e.g., given the navigation state is $\tilde{X}_n$, the likelihood data source 105 i is compromised and should be discarded is a. For example, the information module 120 maintains statistics on data source 105 integrity and/or quality that are dependent on navigation state (e.g., position, altitude, velocity, time) and also on other factors, such as navigation platform 12 configuration (e.g., components included in the system), threat data (e.g., physical threats and obstacles, jamming sources), mission plan (e.g., typical factors encountered during a mission, changes to the plan), environment of deployment (e.g., weather, surrounding terrain, surrounding other navigation facilities, surrounding mobile facilities), types of sensor/internal navigation facility (e.g., common to other multi-sensor navigation platforms, expected performance under conditions), and/or profiles of external navigation sources (e.g., RF navigation signals and sources, visual field data, data channels of navigation data).

The information module 120 uses the models and situation data 125 received from the situation module 130 to determine the estimates of quality and integrity. Because the situation data 125 may change dynamically (as explained below), the information module 120 may update the resulting models accordingly. In this manner, the situation data 125 is used in the integrity monitor module's 110 initial assessment of the reliability of various data sources 105 and also used in subsequent assessments of the data sources 105 over time.

In some embodiments, the information module 120 may also receive source information from one or more of the data sources 105 and use this source information in its models to determine the estimates of integrity and quality. In one embodiment, the information module 120 may determine an estimate of integrity of the source information from one data source 105 by comparing it against source information from one or more other data sources 105.

For example, the information module 120 may receive source information from one or more data sources 105 regarding the tides in the geographical area(s) that the navigation platform(s) have been traveling over, e.g., for the past three hours. The model may be dynamically updated with source information and situation data 125 to reflect any changes in the tide environment over time. For example, if source information from a first data source 105 indicates a low tide for the past three hours and abruptly indicates that the tide is now high, the model may be updated with the source information from the first data source 105 and, based on source information from other data sources 105 and/or situation data 125 received from the situation module 130, the information module 120 may provide an updated estimate of the integrity of the first data source. Similarly, the information module 120 may receive source information from one or more data sources 105 related to stars, and the model may be updated to reflect any changes over time. For example, if source information from one data source 105 indicates that a star is located at a position that deviates widely from past source information from this data source

105 or other data sources 105 regarding the same star, the information module 120 may be updated with the source information from the data source(s) 105 and the information module 120 may use this source information in its model(s) to provide an updated estimate of the integrity of the data source(s) 105.

In another example, the information module 120 may use situation data 125 received from the situation module 130 regarding a newly launched enemy mission known to be within one or more of the navigation platforms' vicinity. The information module 120 may use this situation data 125 to estimate the quality and/or integrity of the source information from the data sources 105 in the vicinity of one or more of the navigation platforms 12 that may be disrupted or spoofed.

In another example, the information module 120 may receive situation data 125 from the situation module 130 regarding a time of day and use this situation data 125 along with source information from data source(s) 105 to provide estimates of the quality and/or integrity using its statistical models. For instance, celestial objects that orbit the earth are known to provide unreliable source information at certain times of the day (e.g., around midnight). Consequently, the information module 120 may use the time of day situation data 125 to estimate the quality and/or integrity of the source information from these celestial objects over time so that this source information is not used in the navigation filter system 100 to determine the navigation information when the source information is unreliable, e.g., around midnight.

The information module 120 includes one or more models that describe a dynamic and probabilistic state of the source information in order to determine the estimates of quality and/or integrity of the source information for each data source 105. When the situation in which the source information is obtained is fully known, then the information module 120 may use a dynamic and probabilistic state of the source information. When the situation in which the source information is obtained is uncertain, then the information module 120 may use a probabilistic state representing the uncertainty associated with the source information.

For example, the situation data 125 may include low visibility due to fog within the immediate environment of the data source(s) 105. Although the data sources 105, e.g., image sensors, might be functioning properly (i.e., they have good perceived quality), the low visibility might render the source information, e.g., the image data, unreliable. Consequently, the information module 120 may use model(s) based on a probabilistic state in order to determine an estimate of integrity of the data sources 105. When the fog lifts and visibility becomes clear, the information module 120 may use model(s) based on a dynamic and probabilistic state to determine the estimate of integrity of the source information.

In another example, the situation data 125 may include data indicating that enemy vehicles in the vicinity of one or more data sources 105 are equipped with radar jamming devices. The proximity and capabilities of the enemy vehicles indicate an uncertain situation with respect to any data sources 105 that rely on radar in that area. In this situation, the information module 120 may use model(s) based on a probabilistic state in order to determine an estimate of integrity of the data sources 105.

The Integrity Monitor Module

The integrity monitor module 110 receives the source information generated by each of the data sources 105 and receives the estimates of quality and/or integrity from the information module 120 to determine whether to validate and supply the source information to the navigation state estimator 115 and, if so, what quality that source information should have. As mentioned above, the integrity monitor module 110 may determine integrity and/or quality based on information from the data sources 105, information from the information module 120, or both. The integrity monitor module 110 sends the validated source information to the navigation state estimator 115, and in some embodiments, the integrity monitor module 110 may refrain from sending source information that has not been validated.

In some embodiments, the integrity monitor module 110 uses navigation information previously generated by the navigation state estimator 115 to determine the integrity and/or quality of the source information. The integrity monitor module 110 may use multiple techniques to determine the integrity of source information. For example, the integrity monitor module 110 may compare $z_i$ to a value of the source information determined by the navigation state estimator 115, for instance, in the case of an extended Kalman filter, $h(\hat{X}_{k|k-1})$, and compare the resultant residual (e.g., the difference between $z_i$ and the value determined by the navigation state estimator 115) to that which would be acceptable given the expected quality of that source information. For example, the resultant residual may be compared to a threshold value and deemed acceptable if it is below the threshold value. In various embodiments, the threshold value may be predetermined, provided dynamically by a sensor, or provided by the information model 120.

As mentioned above, the data source 105 that provides the source information may also provide the quality of that source information, or the information model 120 may provide expected quality of the source information, or both the data source 105 and information model 120 may provide expected quality. The integrity monitor module 110 may determine the integrity and/or quality of the source information from the data source 105 based on a comparison between the source information and its expected value and may ignore the source information when the difference is greater than a quality threshold value or an integrity threshold value and may validate the source information when the quality and/or integrity of the source information falls within a predetermined acceptable range. For example, when the information model 120 and the data source 105 both provide expected quality of the source information and the values substantially differ (e.g., by a percentage, by a numerical factor, based on a threshold), the integrity monitor module 110 may use that difference as a reason to ignore the source information and not validate it, or the integrity monitor module 110 may override the source information quality provided by the data source 105 and replace it with the information model 120 source information quality and then validate and pass the source information to the navigation state estimator 115 with the quality estimate the integrity monitor module 110 provides.

When the integrity monitor module 110 validates source information, the integrity monitor module 110 passes the source information to the navigation state estimator 115 and also passes the quality of the validated source information. As described above, the integrity monitor module 110 receives the source information from one or more data sources 105 and determines the quality and/or integrity of the data sources 105 using the estimate of quality and/or integrity from the information module 120 along with the quality and/or integrity of source information from the data sources 105. The source information from the data sources 105 may be processed, using standard data processing techniques as known by one skilled in the art, before the source information is used by the integrity monitor module 110 and/or the information module 120 and passed to the navigation state estimator 115. Therefore, the source information used in the navigation filter system 100 disclosed herein may include processed or unprocessed source information.

The Navigation State Estimator

The navigation state estimator 115 uses the validated source information from the integrity monitor module 110 to determine the navigation information for one or more navigation platforms 12 in real time. The navigation state estimator 115 provides an estimate of the navigation information at any given time, regardless of how often the navigation state estimator 115 receives the validated source information from the integrity monitor module 110. The navigation state estimator 115 may function using discrete-time Markov processes with a probability density function $f(x|\dot{x})$ that denotes the probability of moving from state $\dot{x}$ to state x. For example, given some state $\{X_n\}_{n \geq 1}$, the source information have marginal densities that are given by $z_n|$ $(X_n = x_n) \sim g(z_n|X_N)$. The implementation of the navigation state estimator 115 may be accomplished by estimation algorithms such as an extended Kalman filter, a particle filter, a nonlinear moment filter, a Hidden Markov Model, and/or a Bayesian filter.

Whenever source information, $z_i^1$, is available from the integrity monitor module 110, the navigation state estimator 115 updates the navigation information or state estimate $\hat{X}_n$ based on whatever additional or new information may be available in the source information to form the best possible state estimate at that point in time. The navigation state estimator 115 then propagates the navigation information or state estimate forward in time as needed by the navigation filter system 100 and in time increments called navigation epochs that may or may not be regular time intervals. The navigation epoch does not need to be constant and does not need to be synchronized with inputs of the validated source information from the integrity monitor module 110 to the navigation state estimator 115. For example, the navigation state estimator 115 may determine the navigation information every second, every few seconds, every minute, or every few minutes, even though the integrity monitor module 110 may be providing validated source information to the navigation state estimator 115 in time intervals longer or shorter than the navigation epochs.

As mentioned above, the navigation state estimator 115 may also transmit the navigation information back to the integrity monitor module 110, where it may be used to validate subsequent source information received from the data sources 105 and/or information module 120. For example, the navigation state estimator 115 receives accelerations and angular rates from data sources 105, such as accelerometers and gyroscopes. This source information may be measured over a period of time, and the result used to determine the navigation information for one or more navigation platforms 12. However, misalignment and bias errors are inherent in the accelerations and angular rates, and both compound over time. When the navigation state estimator 115 receives a validated and updated geolocation position from a GPS system, the source information from the GPS system may be used to bound or otherwise correct for these errors.

As mentioned above, FIG. 7 schematically shows a distributed navigation system architecture 10 with a navigation filter system 100 in an environment in which the architecture may operate. In this example, the navigation platform 12 having an anchor navigator 16 and the navigation filter system 100 is an aircraft (object 101a). The navigation filter system 100 includes numerous data sources 105, such as a GPS satellite, COSS system, stars, planets, and cell phone tower. The data sources 105 send source information to the navigation filter system 100.

In one embodiment, the navigation filter system 100 may be configured to communicate with other navigation platforms 12 (e.g., aircraft 180, unmanned vehicles 181, personal devices 182 of people, vehicles 183). Any of these objects 180-183 may evaluate the environment of the data sources 105 to obtain situation data 125. Then, the objects may transmit the situation data 125 to the situation module 130 of the navigation filter system 100, which, in this embodiment, is located on the navigation platform 12 shown as the aircraft 101a. The navigation filter system 100 may use its situation module 130, information module 120, and integrity module 110 to determine which data sources 105 to rely on and use in its navigation state estimator 115, as described above.

FIG. 8 schematically shows a distributed navigation system architecture 10 and environment in which the navigation filter system 100 may operate. In this example, the navigation filter system 100 is located entirely on a stationary navigation platform 12, such as a base for a government agency. Thus, the stationary navigation platform 12 houses the integrity monitor module 110, the information module 120, the situation module 130, and the navigation state estimator 115. The navigation platform 12 (e.g., aircraft 101a) receives source information from data sources 105 such as satellites 105, stars 105, planets 105, and cellphone towers 105 and transmits the source information to the navigation filter system 100. Furthermore, navigation platforms 12, such as aircrafts 180, 181 may evaluate the existing environment of the data sources 105 to obtain situation data 125, which is provided to the situation module 130 located on the stationary navigation platform 12. The navigation filter system 100 uses the received situation data 125 and source information from the data sources 105 to determine which data sources 105 to rely on and use in its navigation state estimator 115, as described above.

FIG. 9 schematically shows a distributed navigation system architecture 10 and environment in which the navigation filter system 100 may operate. In this example, modules of the navigation filter system 100 are distributed across multiple navigation platforms 12, such as different stationary navigation platforms 12, e.g., bases for a government agency. One navigation platform 12 may house the integrity monitor module 110, the information module 120, and the situation module 130, while the other navigation platform 12 may house the navigation state estimator 115. One of the navigation platforms 12, e.g., the aircraft 101a, may receive source information from data sources 105 such as satellites 105, stars 105, planets 105, and cellphone towers 105 and transmit this information to the integrity monitor module 110 on one navigation platform 12. The navigation platforms 12 (e.g., objects 180, 181) may evaluate the environment of the data sources 105 and provide their situation data 125 to the situation module 130, which may also be located on one navigation platform 12. The integrity monitor module 110 provides validated source information and corresponding quality of the source information to the navigation state estimator 115 on the other navigation platform 12, which uses this information to determine the navigation information of one or more of the navigation platforms 12 (e.g., the navigation platform 12 with the anchor navigator node 16, e.g., aircraft 101a, as well as the navigation information for the other navigation platforms 12 within the communication network).

Other Features

In various embodiments, one or more components of the distributed navigation system architecture 10 and/or the navigation filter system 100 may include one or more processors, memory, an operating system, and one or more programs or applications executing on them to perform the functions described herein (also referred to herein as a "computing platform"). The computing platform may be a stand-alone navigation device (e.g., a hand-held navigation device, a body-mounted navigation device, a smart phone, a tablet, or the like), a navigation device embedded in a user vehicle (e.g., an automobile, a ship, an airplane, a train, a special-purpose vehicle, or the like), or a navigation device embedded in a partially or fully autonomous vehicle (e.g., drone, driverless automobile, robotic device, underwater robotic device, missile, satellite), by way of example. The embodiments of the invention described above are intended to be merely exemplary; numerous variations and modifications will be apparent to those skilled in the art. All such variations and modifications are intended to be within the scope of the present invention as defined by the following claims.

What is claimed is:

1. A distributed navigation system comprising:
a plurality of navigation platforms, each navigation platform having a universal navigation processor configured to communicate with other universal navigation processors over distribution channels in a communication network;
one or more relative navigation systems, in communication with the universal navigation processors, configured to provide source information to the navigation platforms;
one or more navigation filters provided on one or more of the universal navigation processors, each navigation filter configured to process the source information, wherein at least one of the one or more navigation filters is configured to apply at least one statistical model to determine and provide an estimate of the quality and an estimate of the integrity of the source information;
an anchor navigation node disposed on one or more of the plurality of navigation platforms configured to form one or more anchor navigation platforms, the anchor navigation node including an inertial navigation system, a clock, and one or more absolute navigation systems and configured to determine navigation information based on the inertial navigation system, the clock, the one or more absolute navigation systems and the source information, the one or more anchor navigation platforms configured to provide the navigation information over the distribution channels to the other navigation platforms in the communication network;
a navigation processor system in communication with each of the universal navigation processors in the communications network configured to provide software updates or program code to the universal navigation processors; and
a graphical user interface configured to display the navigation information to a user and permit the user to review and control the navigation information, wherein the graphical user interface is configured to display a modification generated autonomously by an anchor navigation platform.

2. The distributed navigation system of claim 1, wherein the graphical user interface is disposed on at least one of the one or more anchor navigation platforms.

3. The distributed navigation system of claim 1, wherein at least one of the one or more navigation filters includes:
   a. a situation module configured to provide situation data;
   b. an information module configured to determine the estimate of the quality and the estimate of the integrity of the source information, at a given time, based on the source information received from one or more data sources and based on the situation data received from the situation module;
   c. an integrity monitor module configured to receive the estimate of the quality and the estimate of the integrity of the source information from the information module and to receive the source information from the one or more data sources, configured to determine the integrity and the quality of the source information based on the estimate of the quality and the estimate of the integrity of the source information from the information module, and configured to validate the source information based on (1) the integrity of the source information, and/or (2) the quality of the source information; and
   d. a navigation state estimator configured to determine the navigation information of the one or more navigation platforms based on the source information that was validated and corresponding quality of the source information received from the integrity monitor module.

4. The distributed navigation system of claim 3, wherein the situation module is configured to receive, from the graphical user interface, an instruction from the user and to provide the instruction to the information module as situation data.

5. The distributed navigation system of claim 4, wherein the instruction modifies a mission plan to maximize performance of one or more of the plurality of navigation platforms.

6. The distributed navigation system of claim 4, wherein the instruction modifies a mission plan to maintain an estimated arrival time at a destination of one or more of the plurality of navigation platforms.

7. The distributed navigation system of claim 3, wherein the situation data is based on past or current performance of the one or more data sources or one or more of the plurality of navigation platforms.

8. The distributed navigation system of claim 3, wherein the situation data is based on past or current performance of the one or more data sources or one or more of the plurality of navigation platforms in a geographical region that overlaps with a mission plan.

9. The distributed navigation system of claim 3, wherein the situation module is configured to receive the situation data from databases with stored situation data previously known, from communication links with updated situation data that changes over time, from the one or more data sources, from detection systems that provide the situation data based on detected conditions, from a user that inputs modifications to the situation data, or any combination thereof.

10. The distributed navigation system of claim 3, wherein the situation data includes environment conditions, position information, velocity, attitude, temporal information, platform configuration, mission phase, data source location, system health, mission plan, threat data, condition of a threat, threat operating capabilities, threat location, temperature, cloud cover, visibility, barometric pressure, terrain, time of year, tides, radiation environment, population, city information, street information, building information, known transmitters, known vehicles, visible stars, location of satellites in the sky, or any combination thereof.

11. The distributed navigation system of claim 1, wherein the modification includes changes to a mission plan to maximize performance of one or more of the plurality of navigation platforms.

12. The distributed navigation system of claim 1, wherein the modification includes changes to a mission plan to maintain an estimated arrival time at a destination of one or more of the plurality of navigation platforms.

13. The distributed navigation system of claim 1, wherein the graphical user interface is configured to display information related to past or current performance of one or more of the plurality of navigation platforms conducting a mission.

14. The distributed navigation system of claim 1, wherein the graphical user interface is configured to display contributions from the one or more data sources to the navigation information for one or more of the plurality of navigation platforms conducting the mission.

15. The distributed navigation system of claim 1, wherein the navigation information includes position, velocity, altitude, errors in position, errors in velocity, errors in attitude, time, clock errors, propagation delays, GPS satellite errors, sensor errors, sensor characterization parameters or any combination thereof.

16. The distributed navigation system of claim 1, wherein the one or more absolute navigation systems include a global positioning system (GPS), a celestial object sighting system (COSS), a magnetic compass, an RF sensor system, or any combination thereof.

17. The distributed navigation system of claim 1, wherein the one or more relative navigation systems include a vision system having an image sensor.

18. The distributed navigation system of claim 1, wherein the plurality of navigation platforms include moving and non-moving platforms.

19. The distributed navigation system of claim 1, wherein the navigation filter includes an extended Kalman filter, a particle filter, a nonlinear moment filter, a Hidden Markov Model, a Bayesian filter or any combination thereof.

20. A distributed navigation system comprising:
a plurality of navigation platforms, each navigation platform having a universal navigation processor configured to communicate with other universal navigation processors over distribution channels in a communication network;
one or more relative navigation systems, in communication with the universal navigation processors, configured to provide source information to the navigation platforms;
one or more navigation filters provided on one or more of the universal navigation processors, each navigation filter configured to process the source information, wherein at least one of the one or more navigation filters is configured to apply at least one statistical model to determine and provide an estimate of the quality and an estimate of the integrity of the source information;
an anchor navigation node disposed on one or more of the plurality of navigation platforms configured to form one or more anchor navigation platforms, the anchor navigation node including an inertial navigation system, a clock, and one or more absolute navigation systems and configured to determine navigation information based on the inertial navigation system, the clock, the one or more absolute navigation systems and the source information, the one or more anchor navigation platforms configured to provide the navigation information over the distribution channels to the other navigation platforms in the communication network;
a navigation processor system in communication with each of the universal navigation processors in the communications network configured to provide software updates or program code to the universal navigation processors; and
a graphical user interface configured to display the navigation information to a user and permit the user to review and control the navigation information, wherein the graphical user interface is configured to display information related to past or current performance of one or more of the plurality of navigation platforms conducting a mission.

* * * * *